Patented Apr. 4, 1944

2,345,700

UNITED STATES PATENT OFFICE 2,345,700

PRODUCTION AND/OR TREATMENT OF POLYMERS

Henry Dreyfus, London, England, assignor to Celanese Corporation of America, a corporation of Delaware No Drawing. Application November 13, 1940, Serial No. 365,499. In Great Britain December 14, 1939

1 Claim. (Cl. 260—78)

This invention relates to improvements in the production and/or treatment of complex organic compounds and is more particularly concerned with the production and treatment of polymeric substances which have a sufficient molecular weight to be fibre- or film-forming.

As is known, there has recently been developed a series of synthetic polymers which have a sufficiently high molecular weight to be fibre-forming and film-forming. In general these polymers are built up by condensation of one or more reagents which have two reactive groups in the molecule by condensation processes with elimination of water, hydrochloric acid or similar simple substances. For example, diamines may be condensed with dicarboxylic acids, aminocarboxylic acids may be condensed with themselves, and so forth. The reagents should be so chosen that they do not give rise to substantial quantities of cyclic compounds. This may be achieved by selecting the reagents in such a way that the unit length of the polymer consists of more than 6 atoms in a chain and preferably more than 7. In the case of condensing diamines with dicarboxylic acids for example, the unit length is arrived at by adding the number of atoms joining the two nitrogen atoms in the diamine plus 2 to the number of atoms joining the carboxylic groups in the dicarboxylic acid plus 2. Where two reagents are used to build up the polymer, they should be employed in substantially equimolecular proportions.

The condensations, particularly those taking place with elimination of water, are preferably effected at fairly high temperatures, especially in the later stages, for example temperatures of the order of 200–300° C. The actual temperature employed will depend upon the particular reagents undergoing condensation, and in some cases much lower temperatures may be used. The resulting polymers may be formed into textile filaments, bristles, ribbons, films and the like, and in order to convert the polymers into such useful forms and in order to work them in a number of other ways, it is frequently convenient to operate at fairly high temperatures, again of the order of 200–300° C. Thus, for instance, filaments may be produced by spinning the molten polymer. In order to spin or work the polymer successfully, it is necessary that it should remain unchanged over considerable periods of time, i. e. many days or even weeks, at the spinning or other working temperatures, but, as has already been indicated, such temperatures are of the same order as the temperatures used for condensation, and hence there is a marked tendency of the polymers to undergo further polymerisation or decomposition and therefore change in properties, particularly viscosity, chemical nature, colour, etc., which affects the regularity of the spinning or other working operation and may even render spinning impossible.

It is the object of the present invention to treat the already formed polymers or to conduct the polymerisation in such a way that the resulting polymers will withstand spinning conditions for considerable periods of time, i. e. as indicated above many days or weeks. The result is that there is no substantial change in the character of the polymer during the prolonged heating which is necessary in any commercial installation for spinning. According to the present invention I achieve this result by adding to the already formed polymer, or by adding to the raw materials before condensation, or by adding to the reaction mass during condensation, small quantities of metal compounds which are substantially non-volatile under the conditions of condensation or give rise to compounds which are substantially non-volatile under these conditions and which can react with the terminal groups of the polymer.

As examples of suitable metal compounds, I may mention the mono-metal salts of dicarboxylic acids, the di-metal salts of tricarboxylic acids. and generally the metal salts of polycarboxylic acids in which one carboxy group remains uncombined with the metal; the mono-metal salts of sulphocarboxylic acids, of disulphonic acids, and again generally the metal salts of sulphonic acids or sulphocarboxylic acids in which one acid group remains uncombined with the metal; the metal salts of aminocarboxylic acids or of aminosulphonic acids; and compounds which under the reaction conditions are or can be converted into the above compounds. For example, while, as already indicated, I may use a mono-metal salt of a dicarboxylic acid, for example monosodium adipate, any compound which under the reaction conditions gives rise to such a compound may be employed. For instance, in the condensation of a diamine with a dicarboxylic acid, for instance adipic acid, there may be added the requisite small quantity of a metal hydroxide, a metal carbonate, a metal acetate or other metal salt of a monocarboxylic acid, for instance lauric acid, benzoic acid, stearic acid, palmitic acid, lactic acid and the like, metal alcoholates, metal phenolates, metal amides, for example sodamide, and metal salts of amines, for example the sodium salt of aniline, which are all capable of combining with the dicarboxylic acid to yield a metal salt of the dicarboxylic acid, and thus are the equivalents of such a metal salt.

I prefer to employ compounds of the metals of groups 1 and 2 of the periodic system, for example those of sodium, potassium, magnesium, calcium, zinc, strontium and barium, though other metals, particularly those giving rise to colourless compounds, for example aluminium and lead, may be employed. As suitable compounds I may, for example, employ sodium carbonate, caustic soda, sodium acetate, sodium benzoate, sodium stearate, sodium lactate, sodium ethylate, sodium phenolate, the sodium salt of aniline, sodamide, mono-sodium oxalate, mono-sodium succinate, mono-sodium adipate, mono-sodium phthalate, the mono-sodium salt of hexahydro-phthalic acid, di-sodium citrate, sodium salt of glycine, of amino-propionic acid, anthranilic acid and the like; or the corresponding compounds of the other metals mentioned above. Metal compounds which are soluble in the melted polymer or in the solvent medium in which the condensation is carried out or in which the subsequent stabilisation is carried out are particularly suitable. Especially valuable results have been obtained with zinc acetate.

It will be apparent that most of the above metal compounds are capable of combining with terminal amino groups. Some of them, notably the metal salts of amino-sulphonic and amino-carboxylic acids, are capable of combining with terminal carboxy groups. Other suitable compounds which can combine with terminal amino groups are the metal salts of halogenated carboxylic acids or halogenated sulphonic acids, for example chlorinated aliphatic acids or aromatic acids, e. g. chlorbenzoic acid, chlorethane sulphonic acid, chlorbenzene sulphonic acid, etc.

In some cases, for example where the condensation to produce the polymer results in the elimination of a hydrohalide acid, one or more of the terminal groups of the polymer may be a halogen atom. In such a case the metal salts of amino-sulphonic and amino-carboxylic acids are suitable for use in accordance with the present invention.

The amount of metal compound which is to be added in accordance with the present invention depends upon the viscosity desired in the ultimate polymer. Where low viscosity products are required, and these may be used for example in lacquers or similar coating compositions, proportions of metal compound of the order of 2-5% molecular concentration in relation to the amount of reagents undergoing polymerisation may be used. In most cases where polymers of sufficient viscosity to be film- or fibre-forming are required, lower molecular concentrations may be employed, for example molecular concentrations of the order of 0.1-2%. In all cases a simple experiment will serve to determine the amount of metal compound necessary to achieve a given viscosity. The viscosity in the case of fibre-forming polymers may be such that the molecular weight is of the order of 4000 or more, and particularly 6000-10000.

As already indicated, the metal compounds to be used in accordance with the present invention may be added to the already formed polymer, in which case a comparatively short heating serves to bring about the desired reaction, or may be added to the original reagents before any condensation takes place, or may be added at any suitable stage during the condensation. In the case of adding the metal compound before or during the condensation, the condensation conditions themselves generally serve to bring about the desired reaction. The condensation is preferably carried out in presence of a solvent for the raw materials and for the polymer itself. Similarly it is desirable at whatever stage the metal compound is added that it too should be soluble in the solvent employed. Phenolic compounds, for example phenol, the cresols, xylenols, oxy-di-phenyls and the like, are generally suitable.

In the above description I have particularly instanced as suitable metal compounds metal compounds of carboxylic acids and sulphonic acids or substances giving rise to such compounds, as these are most suitable for the purposes of the present invention. However, the invention is not limited to such compounds and also includes the use of metal compounds of other oxygen-containing mineral acids or organic derivatives of such mineral acids, for example the appropriate metal salts of phosphoric and phosphonic acids and of arsonic acids.

The following examples illustrate the invention but do not limit it in any way:

*Example 1*

30 parts of zinc acetate are added to 200 parts of hexamethylene diammonium adipate (the salt of hexamethylene diamine and adipic acid) and 200 parts of xylenol in a substantially closed vessel fitted with a thermometer, a delivery pipe for purified nitrogen, and an outlet pipe for the nitrogen. The contents of the vessel are heated to a temperature of 220° C. while bubbling a steady stream of nitrogen through the reagents. The heating is continued for about 7 hours or until the intrinsic viscosity of the polymer obtained no longer rises, as can be ascertained by periodic tests of samples withdrawn for the purpose. In this way an intrinsic viscosity of the order of 0.7 can readily be obtained, and the polymer may be formed into filaments from a melt, the viscosity of the polymer undergoing no further rise during such melt spinning. The intrinsic viscosity is equal to $$\frac{\log_e \eta r}{C}$$

in which $\eta r$ is the viscosity of a 1% solution of the polymer in metacresol divided by the viscosity of metacresol at the same temperature and in the same units, and $C$ is the concentration expressed in grams per 100 cc. of solution.

*Example 2*

In the above example, the molecular proportions are approximately 2 molecules of zinc acetate to 100 molecules of hexamethylene diammonium adipate. The example is repeated using 1 molecular proportion of zinc acetate to 100 molecules of hexamethylene diammonium adipate or similar diamine dicarboxylic acid salt, for example tetramethylene diammonium sebacate.

Having described my invention, what I desire to secure by Letters Patent is:

Process for the production of stable linear condensation polymers which comprises condensing a diamine containing at least one hydrogen atom directly attached to each nitrogen atom with a dicarboxylic acid, the reagents being such as to yield a polymer having a unit length of at least 7 and condensation being effected in the presence of zinc acetate in an amount not exceeding 2% of the weight of the reagents.

HENRY DREYFUS.

CERTIFICATE OF CORRECTION.

Patent No. 2,345,700. April 4, 1944.

HENRY DREYFUS.

It is hereby certified that error appears in the printed specification of the above numbered patent requiring correction as follows: Page 1, second column, line 41, after the word and period "employed." insert --A suitable type of reagent for this purpose is a metal salt of an acid weaker than the dicarboxylic acid.--; and that the said Letters Patent should be read with this correction therein that the same may conform to the record of the case in the Patent Office.

Signed and sealed this 6th day of June, A. D. 1944.

Leslie Frazer (Seal)                  Acting Commissioner of Patents.